Patented Feb. 20, 1923.

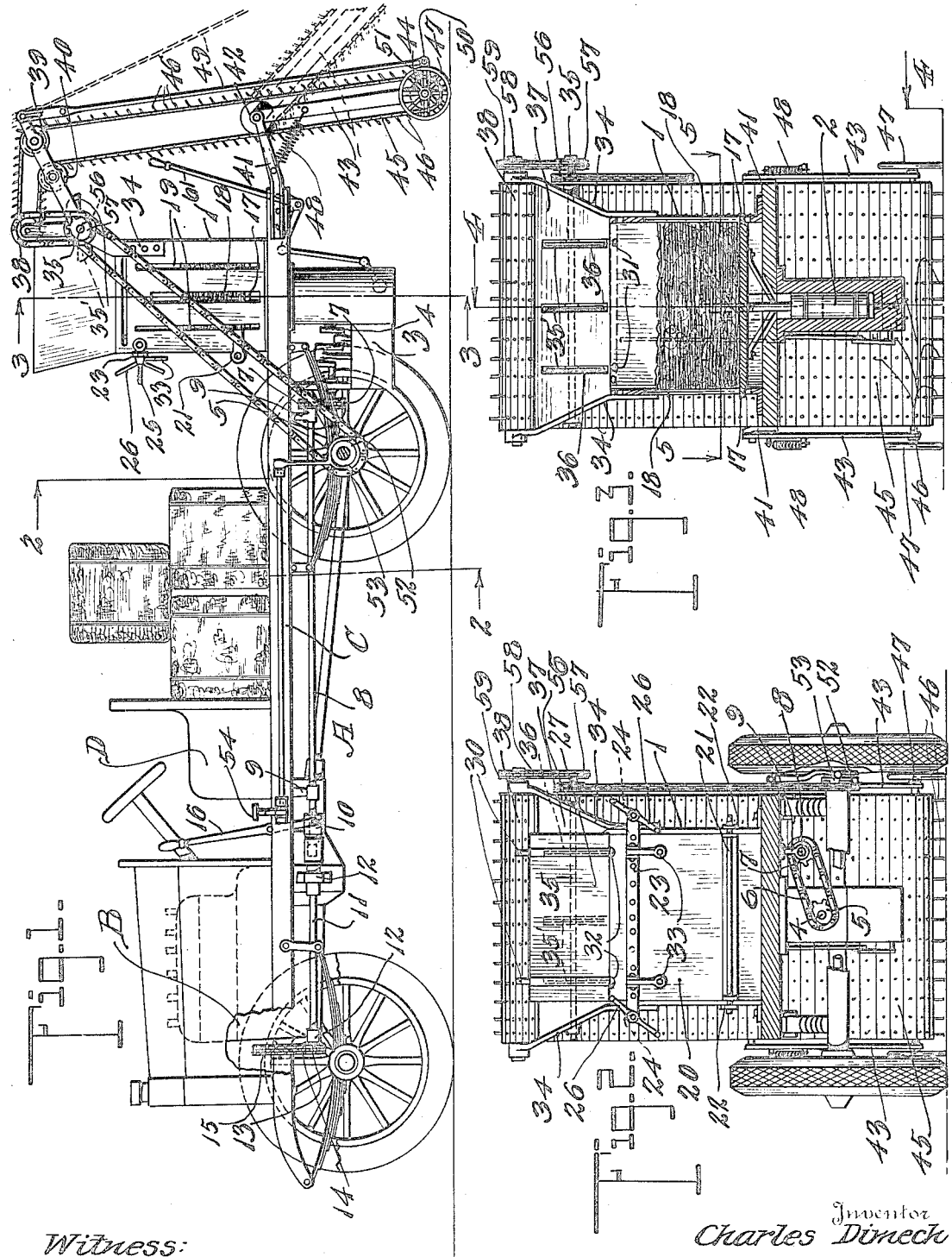

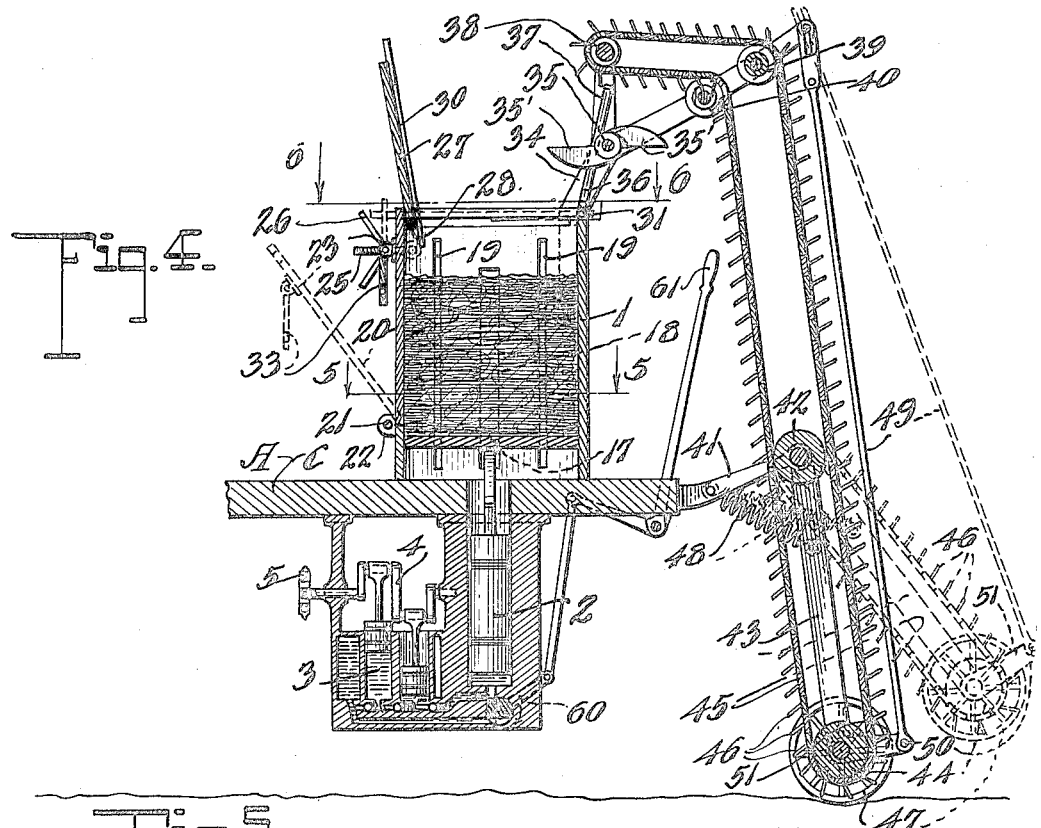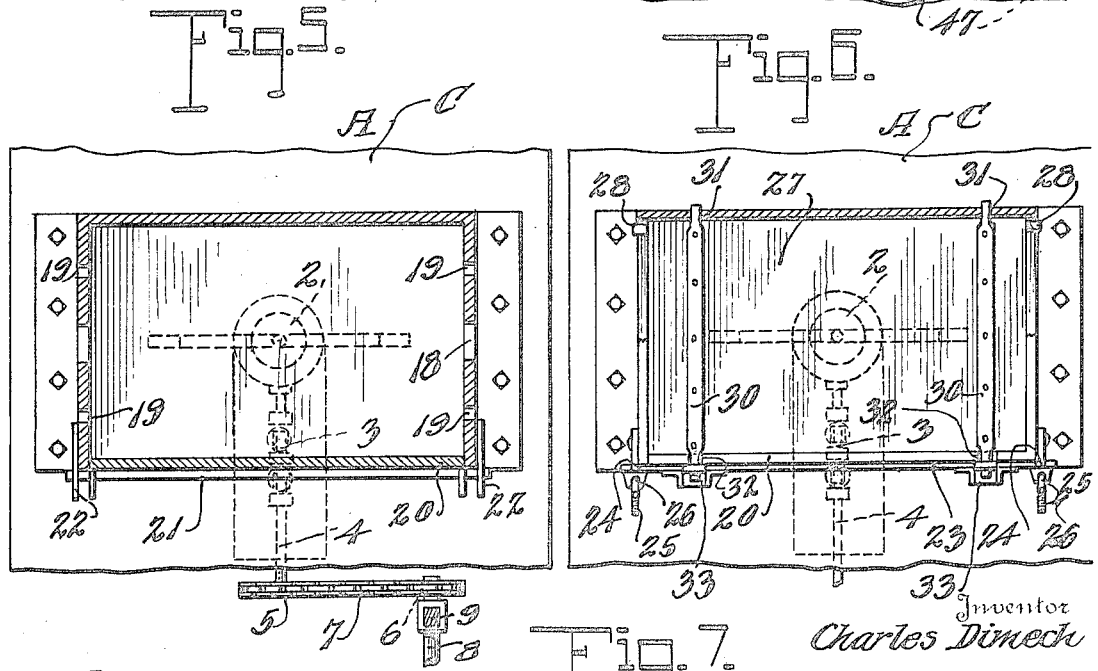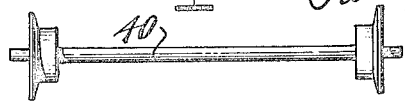

1,446,337

UNITED STATES PATENT OFFICE.

CHARLES DIMECH, OF NEW YORK, N. Y.

HAY RAKE AND BALER.

Application filed June 21, 1921. Serial No. 479,262.

*To all whom it may concern:*

Be it known that I, CHARLES DIMECH, a citizen of the United States, residing at New York, in the county of New York and State of New York, have invented certain new and useful Improvements in Hay Rakes and Balers, of which the following is a specification.

My invention relates to hay rakes and balers and has for its object to provide a power-operated machine of improved construction for raking the hay, baling it as it is being raked, and transporting the bales out of the field.

The above and such other objects as may hereinafter appear are attained by the novel construction, combination and arrangement of parts to be hereinafter specifically described and claimed.

Reference will now be had to the accompanying drawings forming a part of this specification, wherein:

Figure 1 is a side elevation of the machine.

Figure 2 is a transverse sectional view taken on the line 2—2 of Figure 1 and looking in the direction of the arrows.

Figure 3 is a section taken on the line 3—3 of Figure 1 and looking in the direction of the arrows.

Figure 4 is a vertical sectional view taken on the line 4—4 of Figure 3 and looking in the direction of the arrows.

Figure 5 is a horizontal sectional view taken on the line 5—5 of Figure 4 and looking in the direction of the arrows.

Figure 6 is a sectional view taken on the line 6—6 of Figure 3 looking in the direction of the arrows.

Figure 7 is a detail view of one of the rollers for the rake mechanism.

Throughout the following detailed description and on the several figures of the drawing, similar parts are referred to by like reference characters.

Referring to the drawings, the reference character A designates a truck having a motor B connected by transmission means of conventional form with the ground wheels and a body C provided near the front thereof with the seat D for the driver.

Mounted upon the body C near the rear end thereof is a baling box or press 1 provided with a plunger 2 operated by a hydraulic pump 3 of conventional construction. The pump 3 comprises a crank shaft 4 carrying a sprocket wheel 5 connected by sprocket chain 6 with a second sprocket wheel 7 on a shaft 8. The shaft 8 extends longitudinally of the truck body, being supported beneath the latter in suitable bearings 9. Splined upon the forward end of shaft 8 is the male member of a cone clutch 10, the female member of said clutch being mounted upon the rear end of a shaft 11 supported beneath the truck body in bearings 12 in alignment with the shaft 8. The forward end of the shaft 11 carries a sprocket wheel 13 connected by means of a sprocket chain 14 with a sprocket wheel 15 on the crank shaft of the motor B. The drive connection between the motor B and shaft 11 can be made by taking the sprocket chain which drives the fan off the fan pulley and connecting it with the sprocket wheel 13 on shaft 11, or an extra sprocket wheel can be provided on the crank shaft of the motor and connected by a sprocket chain with the sprocket wheel 13, leaving the fan drive undisturbed.

For shifting the male member of the clutch 10 longitudinally of the shaft 8 to engage it with or disengage it from the female member on the shaft 11 a lever 16 is provided pivoted to the frame C and conveniently located for operation by the driver on the seat D.

The head of the plunger 2 is a rectangular flat member which fits the interior of the box or press 1 and having lugs 17 projecting from its opposite ends which are guided in slots 18 in the end walls of the press. The end walls of the press are also provided with slots 19 for the passage of the wires by means of which to tie the bales.

The press 1 is provided in its front side with a door 20 provided at its lower edge with a hinge rod 21 journaled at its opposite ends in openings in metallic hinge members 22 fastened to the end walls of the press. Secured to the outer face of the door 20 adjacent its upper edge is a flat metal bar 23 which extends parallel to the upper edge of the door and projects at its opposite ends beyond the opposite ends of the door. The projecting ends of the bar 23 are provided with slots 24 and pivoted to the opposite end walls of the press are latch bolts 25 having screw-threaded ends engaged by wing nuts 26. When the door 20 is closed the bolts 25 are adapted to be swung downwardly on their pivots until they engage in the slots 24 in the ends of the bar 23, whereupon the wing nuts 26 may be tightened to securely fasten the door closed.

The press is provided with a top or cover 27 having at its opposite ends integral lugs or projections 28 guided for sliding movement in horizontal slots 29 in the end walls of the press. The cover 27 is adapted to occupy either the open position shown in Figure 1 or the closed position shown in Figure 6. Fastened to the outer face of the cover are a pair of flat metal bars 30 extending transversely of the cover and projecting beyond its front and rear edges. When the cover is in the closed position shown in Figure 6 the rear projecting ends of the bars 30 are engaged in openings 31 in the rear wall of the press and the forward projecting ends thereof occupy slots 32 formed in the upper edge of the front wall of the press. Hinged to the bar 23 are a pair of metal straps 33 having openings in their free ends. When the cover is closed as shown in Figure 6 the straps 33 may be swung vertically on the bar 23 and engaged with the forward ends of the bars 30, the ends of the bars 30 being received in the openings in the ends of the straps, whereby the cover will be prevented from lifting under the action of the hydraulically operated plunger during the baling operation. When it is desired to open the cover the straps 33 are swung out of engagement with the bars 30 and the cover slid forwardly to the position shown in Figure 1, the lugs 28 sliding in the slots 29.

Bolted to the end walls of the press are forged steel frame members 34 which carry the upper rollers of the rake mechanism.

Journaled in the frame members 34 is a shaft 35 which carries arms or blades 35' which operate through slot 36 in the rear inclined wall 37 of the mouth of the press and help to feed the hay down into the press and compact it therein.

Journaled in the frame members 34 just above the upper edge of the wall 37 is a roller 38 and the frame members carry two other rollers 39 and 40 slightly to the rear of the roller 38.

Projecting from the rear end of the truck body are a pair of forged steel frame members 41 in the free ends of which is journaled a roller 42. Arms 43 are pivoted at their upper ends to the free ends of the members 41 and at their lower ends carry a roller 44. Passing around the rollers 38 and 44 and over the rollers 39 and 40 is the rake in the form of an endless belt 45 provided with picker teeth 46. The roller 40 is formed as shown in Figure 7 to permit the passage of the picker teeth. Carried by the lower ends of the arms 43 are wheels 47 which normally maintain the rake about four inches away from the ground.

Coil springs 48 are fastened at one end to the frame members 41 and at the other end to the arms 43 for yieldingly maintaining the wheels 47 in contact with the ground but permitting the rake to swing upwardly when any obstruction is met with or when the truck wheels go into a ditch or depression.

In order to prevent the hay from blowing away as it is being carried up to the press by the rake the latter is provided with a cover which consists of light steel bars 49 arranged in spaced relation and pivotally and slidably mounted at their upper ends upon a rod 50 extending between the frame members 34 above the roller 39. At their lower ends the bars are connected to a rod which has its ends secured in arms 51 rigidly connected to the lower ends of the arms 43.

A sprocket wheel 52 is loosely mounted upon the rear axle of the truck and is adapted to be clutched thereto by means of a clutch 53 operable by a foot pedal 54 in front of the driver's seat.

Sprocket wheel 52 is connected by means of a sprocket chain 55 with a sprocket wheel 56 on the shaft 35. A second sprocket wheel 57 on the end of the shaft 35 is connected by a sprocket chain 58 with a sprocket wheel 59 on the roller 38.

The operation of the machine is as follows: In going to or from the field the cone clutch 10 will be disengaged in order that the hydraulic pump may not be driven and the clutch 53 on the rear axle will also be disengaged in order that the rake mechanism may not be operated. The rake mechanism may also be slightly lifted at this time as indicated by the dotted line positions in Figures 1 and 4 and if desired the cover mechanism may be removed and only put in position on the machine when the latter reaches the field.

Upon reaching the field the rake mechanism will be lowered and the cover will be placed in position. The clutch 53 will then be engaged to cause the rake to be operated as the machine moves through the field. The hay will be picked up by the picker teeth on the endless belt and carried up and deposited into the press, the revolving blades 35' on the shaft 35 helping to feed the hay down into the press and compacting it therein. When the press is full or contains sufficient hay for a bale the truck will be stopped, the motor continuing to run. The cover of the press will then be closed and secured in position by swinging the straps 33 into engagement with the forward ends of the bars 30. After this has been done the cone clutch 10 will be engaged to start the hydraulic pump 3 into operation which will cause the plunger 2 to rise in the press and compress the hay therein into a bale after which the ends of the wires in the slots 19 may be brought together and fastened to tie the bale. After the bale has thus been formed the wing nuts 26 on the bolts 25 may be loosened and the bolts 25 disengaged from the bar 23 to permit the opening of the door 20. The formed bale may then be taken out of the press and positioned on the truck body and the door 20 again closed and the raking and baling operation repeated until a sufficient number of bales have been formed to constitute a load. The load may then be transported out of the field to the desired destination.

A controlling valve 60 in the hydraulic pump 3 is provided so that when the bale of hay is sufficiently compressed upon movement of said valve 60 by the operator through the lever 61 the upward movement of the plunger 3 and its platform may be discontinued, and upon further movement of said valve 60, after the hay has been wired or tied, the pressure may be completely relieved, allowing the plunger and platform in the baling box to be returned to normal position ready for the next bale.

Having thus described my invention, what I claim as new and desire to secure by Letters Patent is:

1. In a portable machine of the class described, the combination with a gathering mechanism, of a press comprising a baling chamber having a feed opening at the top to receive the hay elevated thereto by the gathering mechanism, a press plunger constituting the bottom of said baling chamber, a cover for the feed opening against which the hay is pressed by the plunger, and a sliding connection between one side of the cover and the baling chamber permitting the cover to be shifted from its closed to open position at one side of the feed opening.

2. In a portable machine of the class described, the combination with a gathering mechanism, of a press comprising a baling chamber having a feed opening at the top to receive the hay elevated thereto by the gathering mechanism, a press plunger constituting the bottom of said baling chamber, a cover for the feed opening against which the hay is pressed by the plunger, a sliding connection between one side of the cover and the baling chamber permitting the cover to be shifted from its closed to open position at one side of the feed opening, and means carried by the cover engageable with the side walls of the chamber incident to closing of the cover for sustaining the pressure produced by the plunger.

3. A hay baling apparatus of the class described, comprising a baling chamber or receptacle adapted to be mounted upon a wheeled vehicle and having a feed opening at the top, a plunger mounted in said chamber and constituting the bottom thereof, guide means on said plunger slidingly engaging with the sides of the receptacle, an engine operated pump for actuating the plunger, and a cover having shiftable connection with the top of the receptacle to close the feed opening and when open forming a side of the mouth of the receptacle.

4. A hay baling apparatus of the class described, comprising a baling chamber having a feed opening at the top, a plunger mounted in said chamber and constituting the bottom thereof, guide means on said plunger projecting through the side walls of the chamber, a cover member slidably connected with the top of the chamber and adapted to be positioned at one side thereof to assist in directing the disposition of the hay in the chamber, packing means mounted at the opposite side thereof, and means for feeding the hay to the mouth of the receptacle over the packing means.

5. A combined hay gathering and baling apparatus of the class described, comprising a baling chamber adapted to be mounted upon a wheeled vehicle, a plunger mounted in said chamber, pump means for actuating said plunger, a cover member for closing the chamber and against which the material is pressed when the chamber has been filled with hay, and hay gathering mechanism secured at one side of said chamber and including an endless rake member, the lower portion of said rake member being mounted for swinging from operative to inoperative position with respect to the surface of the ground.

6. A combined hay gathering and baling apparatus of the class described, comprising a baling chamber adapted to be mounted upon a wheeled vehicle, a plunger mounted in said chamber, pump means for actuating said plunger, a cover member for closing the chamber and against which the material is pressed when the chamber has been filled with hay, hay gathering mechanism secured at one side of said chamber and including an endless rake member, the lower portion of said rake member being mounted for swinging from operative to inoperative position with respect to the surface of the ground, and manually operated means for shifting the lower end of said rake member into inoperative position.

In testimony whereof I affix my signature.

CHARLES DIMECH.